United States Patent
Jackson et al.

(10) Patent No.: US 7,589,638 B2
(45) Date of Patent: Sep. 15, 2009

(54) MULTI-FUNCTION IMPLANTABLE CHIP FOR PETS

(76) Inventors: Janet Jackson, 7692 Shannon Lakes Way, Indianapolis, IN (US) 46217; Michael Parson, 379 Innisbrooke Ave., Greenwood, IN (US) 46142

( * ) Notice: Subject to any disclaimer, the term of this patent is extended or adjusted under 35 U.S.C. 154(b) by 565 days.

(21) Appl. No.: 11/543,849

(22) Filed: Oct. 6, 2006

(65) Prior Publication Data

US 2008/0083379 A1    Apr. 10, 2008

(51) Int. Cl.
*G08B 23/00*     (2006.01)
(52) U.S. Cl. .................................................. 340/573.3
(58) Field of Classification Search .............. 340/573.3, 340/539.13, 539.11, 573.1; 342/357.01, 342/357.07; 119/712
See application file for complete search history.

(56) References Cited

U.S. PATENT DOCUMENTS

| | | | | |
|---|---|---|---|---|
| 5,850,196 A | * | 12/1998 | Mowers | 342/357.07 |
| 5,855,609 A | * | 1/1999 | Knapp | 128/898 |
| 6,910,050 B2 | * | 6/2005 | Pawlick | 707/104.1 |
| 7,489,251 B2 | * | 2/2009 | Wang et al. | 340/573.1 |
| 2004/0246126 A1 | * | 12/2004 | Pitts | 340/539.13 |
| 2007/0171047 A1 | * | 7/2007 | Goodman et al. | 340/539.13 |
| 2007/0221140 A1 | * | 9/2007 | Warren et al. | 119/859 |

* cited by examiner

*Primary Examiner*—Phung Nguyen
(74) *Attorney, Agent, or Firm*—Daniel J. O'Connor (57) ABSTRACT

A method and system related to pet medical care and pet location which includes an implantable multiple function chip. The chip includes data storage portions for identification, medical notices and GPS location parameters. The method and system further includes first and second wireless receiver and transmitter devices to be utilized by a veterinarian and a pet owner respectively. The business method and system are designed to be marketed through the offices of veterinary medical doctors and animal health clinics.

3 Claims, 11 Drawing Sheets

| PET NAME |
| PET OWNER NAME |
| ADDRESS |
| PHONE |
| E-MAIL |
| SPECIAL NOTES |

| |
|---|
| SHOT #1 DUE DATE |
| SHOT #2 DUE DATE |
| MEDICATION DUE DATE |
| CHECKUP DATE #1 |
| CHECKUP DATE #2 |
| SPECIAL NOTES |
| |
| |
| |

SEPT. 30.

MEDICAL CHECKUP

MESSAGE SENT

SEPT. 4.

POSSIBLE EMERGENCY

PLEASE CONTACT OFFICE 555-3456

MULTI-FUNCTION IMPLANTABLE CHIP FOR PETS

BACKGROUND AND OBJECTS OF THE INVENTION

The present invention is generally related to the animal husbandry, pet and electronics arts and, in particular, to a novel system and method for providing identification, medical care notices and tracking for an animal such as a pet.

As described in the prior art patents section of this specification, it has been known to utilize global global positioning systems, i.e. GPS, in combination with a collar placed on the neck of an animal such as a dog.

It has also been recently known to implant an identification tag under the skin of an animal to enable it to be recovered in the event an external tag has been removed.

Such systems are in the early stages of development and no effective unified and comprehensive system has been set forth to enable numerous functions and operating methods to be accomplished by utilizing a single implantable chip element.

Accordingly, it is an object of the present invention to set forth a novel system, method of use and business method which combines multiple functions into a single implantable chip.

It is a futher object of the invention to demonstrate a multiple function implantable chip in which the data stored therein may be changed at the option of a pet owner or treating veterinarian.

It is a further object to show a system and method wherein output data may be displayed on a hand-held screen, computer or television screen.

It is also an object of the invention to describe a useful system wherein output data may be selectively transmitted to the internet at the option of a pet owner.

The described system has further utility as part of a business method of use which may be marketed through veterinarians and may include specifically designed software programs which are tailored to customer needs and desired parameters.

The described method of use enables a pet owner to prevent loss of a pet and also to prevent disease by means of notification of necessary medical treatments regarding, for example, the outbreak of a particular harmful virus.

These and other objects and advantages of the invention will be apparent to those of skill in the animal protection and treatment arts.

PRIOR ART PATENTS AND DESIGNS

During the course of preparing this specification for submission to the U.S. Patent Office, a full search of the prior art was conducted.

U.S. Pat. No. 6,720,879 teaches the use of an animal collar including a GPS tracking and location device. It includes a controller, video camera and wireless communication elements.

U.S. Pat. No. 6,721,681 issued to Christian et al. also teaches an animal collar type system which includes a central processor CPU and speaker elements to prompt a search and rescue animal such as a dog.

The '681 patent further includes a hazardous material detector and camera functions to monitor the search activity of the rescue animal.

The present invention includes a number of additional elements which make it particularly suited for use by a veterinarian and pet owner to provide identification, medical notices and pet tracking to to promote enhanced pet safety.

SUMMARY OF THE INVENTION

The system, method of use and business method includes an implanted multiple function chip which has identification, medical notice and GPS tracking capabilities.

The system includes two wireless transmitter/receiver units which are utilized by a veterinarian and a pet owner.

A first wireless transmitter is used by a veterinarian to enter identification and medical notice data onto the multi-function chip.

A second wireless transmitter unit is utilized by a pet owner to enter tracking or GPS data such that a home base location is easily established. If the pet leaves a certain predetermined area, a notice is electronically given to the pet owner and a tracking display function is initiated.

The data may be displayed on a handheld screen, cellular phone or a larger computer screen.

FULL DESCRIPTION OF THE PREFERRED EMBODIMENTS

Figure 1:
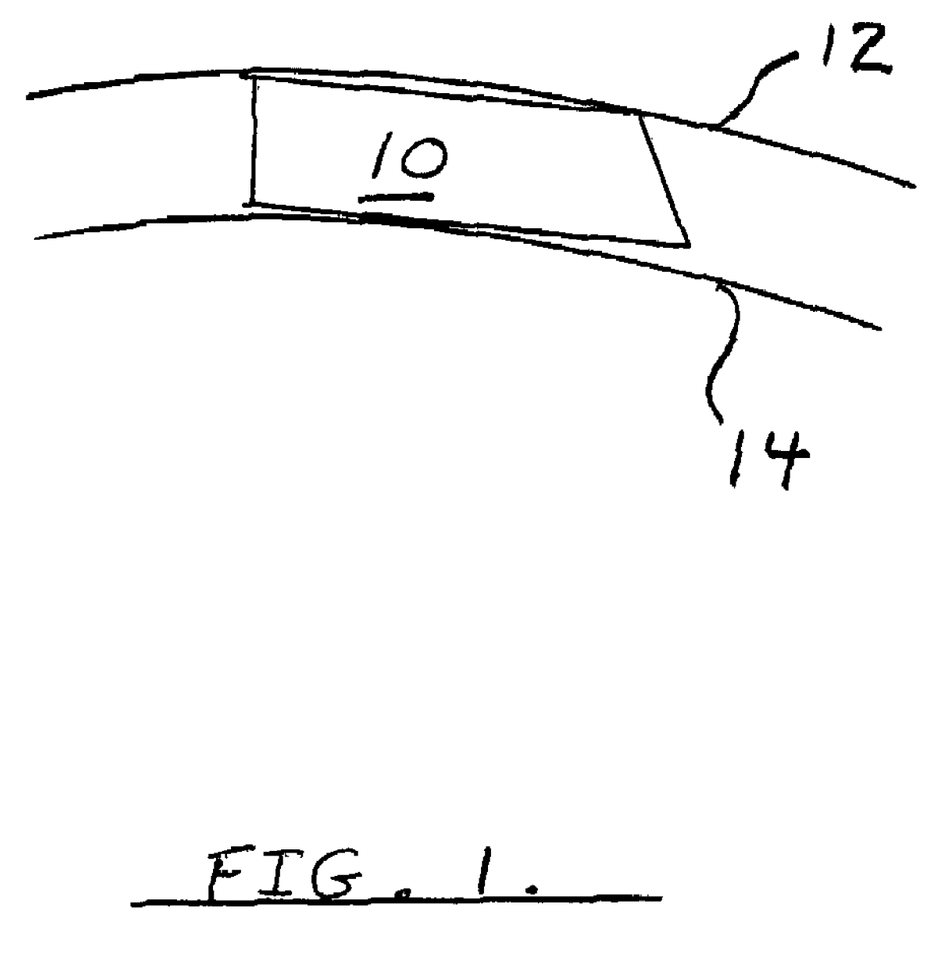
FIG. 1 is a schematic view of a multi-function chip implanted within outer layers of a pet.

Referring to the drawing figures, FIG. 1 shows a minature chip 10 which has been implanted under the outer skin layer 12 of an animal. The chip rests on a lower dermal or muscle layer 14. The chip 10 may, for example, be implanted in the back neck region so that it is of no discomfort to the pet and also may not be removed by the pet.

Figure 2:
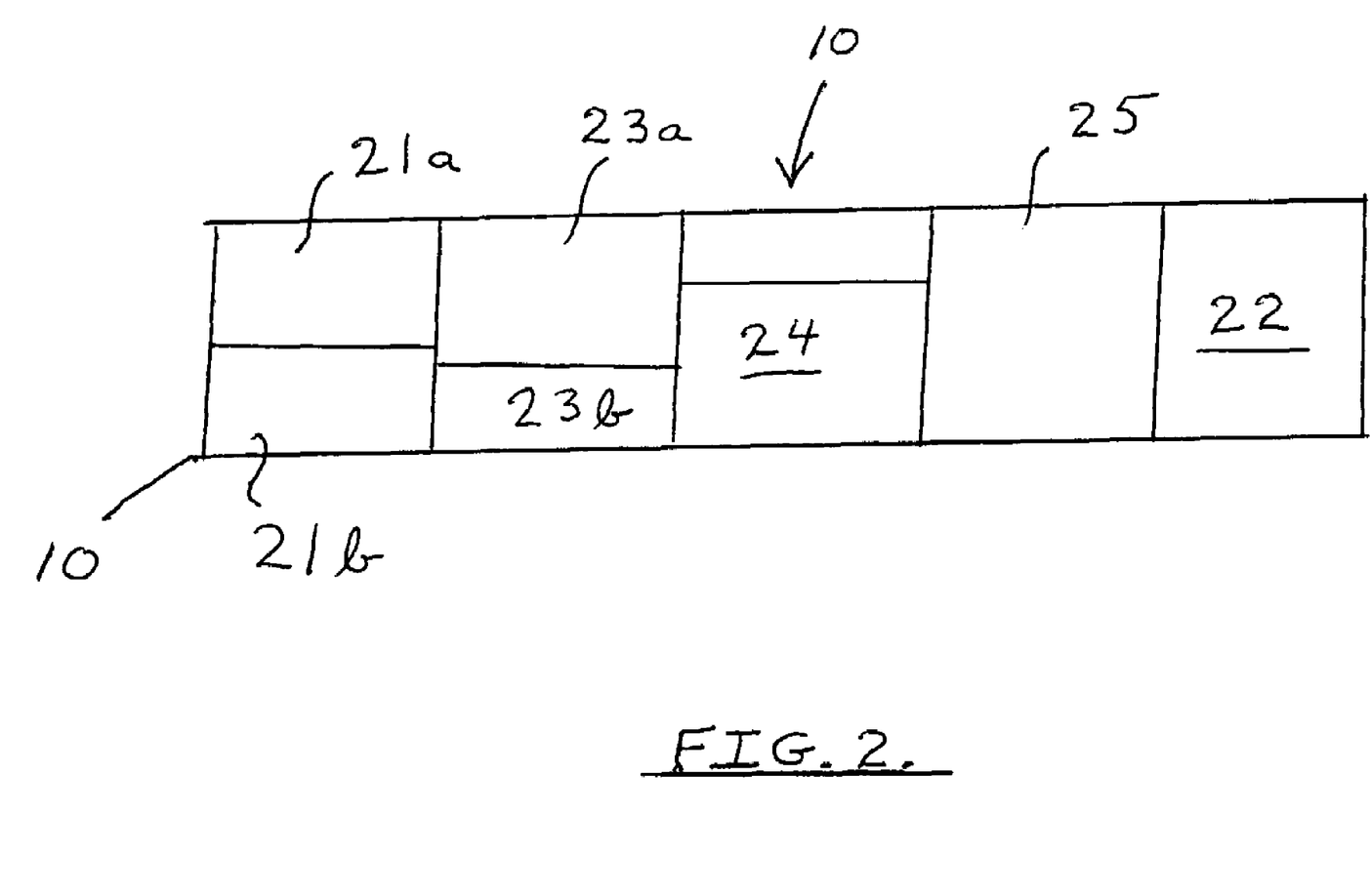
FIG. 2 is a schematic view of the multi-function areas contained within the implantable chip.

FIG. 2 shows more detail of the chip 10 wherein sections 21a and 21b indicate identification and medical records portions of the chip respectively.

Data receiving and transmitting portions of the chip 10 are indicated schematically at numerals 23a and 23b respectively. Numeral 24 indicates a power source.

A central processor or CPU which includes a data storage portion is shown at numeral 25.

The global positioning or GPS portion of the chip 10 is indicated at numeral 22 and the operating features thereof are further described herein.

Figure 3:
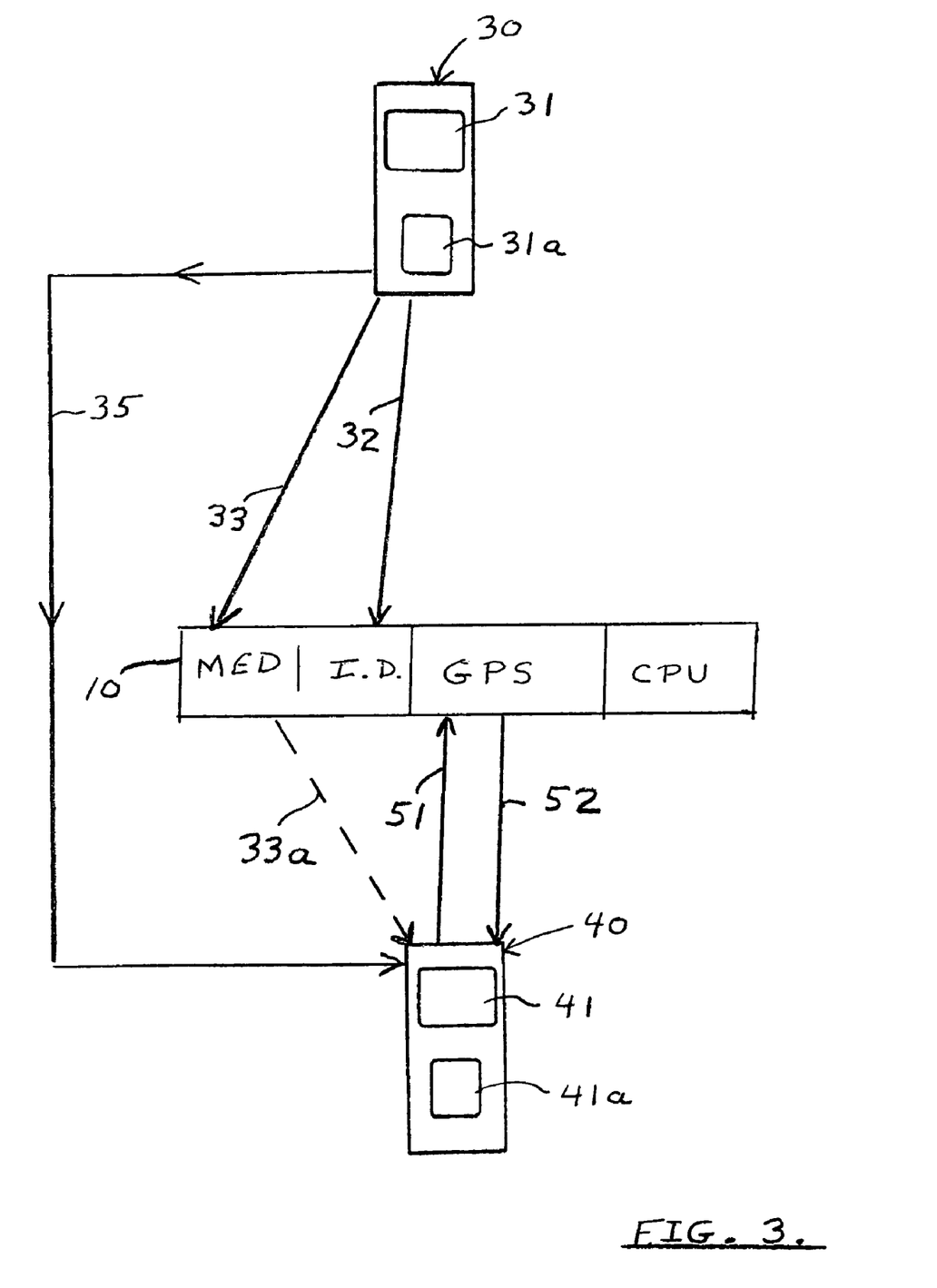
FIG. 3 is an overall schematic view of the implantable chip in combination with wireless receiver/ transmitter units which are utilized by a veterinarian and a pet owner respectively.

Referring to FIG. 3, the chip 10 is shown as part of an overall operating system or method. The main portions of the chip are indicated as "I.D.", "MED", GPS and CPU respectively. Such indicators stand for identification information, medical notices and information, global positioning system and central processor respectively.

The operating system includes a wireless transmitter/receiver or cellular phone device 30 which includes a display screen 31 and a keyboard area 31a.

It is to be understood that the wireless device 30 would be utilized in a veterinarian's office for purposes to be further described.

Figure 4:
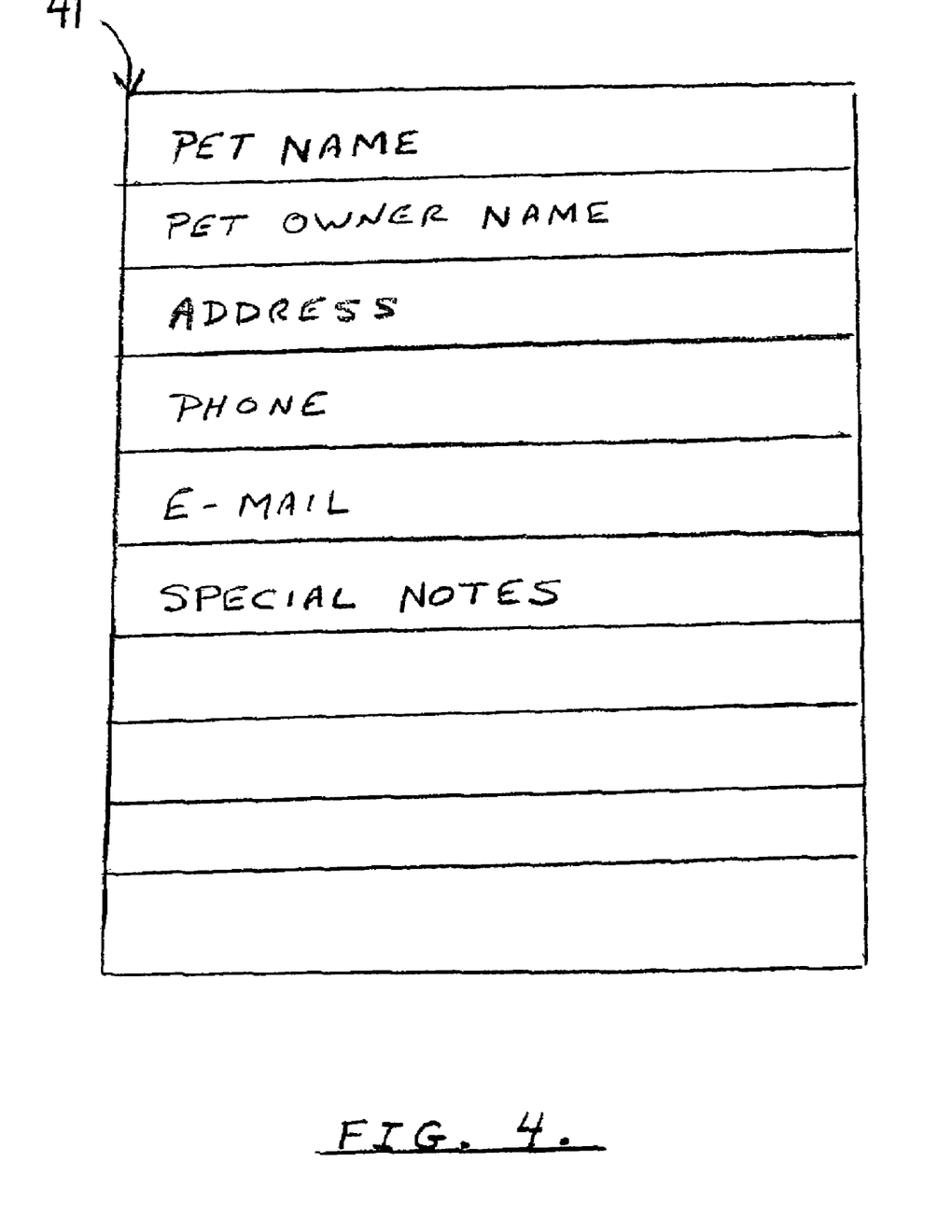
FIGS. 4-7 are representative of the types of displays regarding pet identification and medical treatment notices which are transmitted to the screen of a pet owner.

As indicated by arrow 32, identification data can be entered into the chip 10 at the veterinarian's office and may include data of a type shown in FIG. 4.

Figure 5:
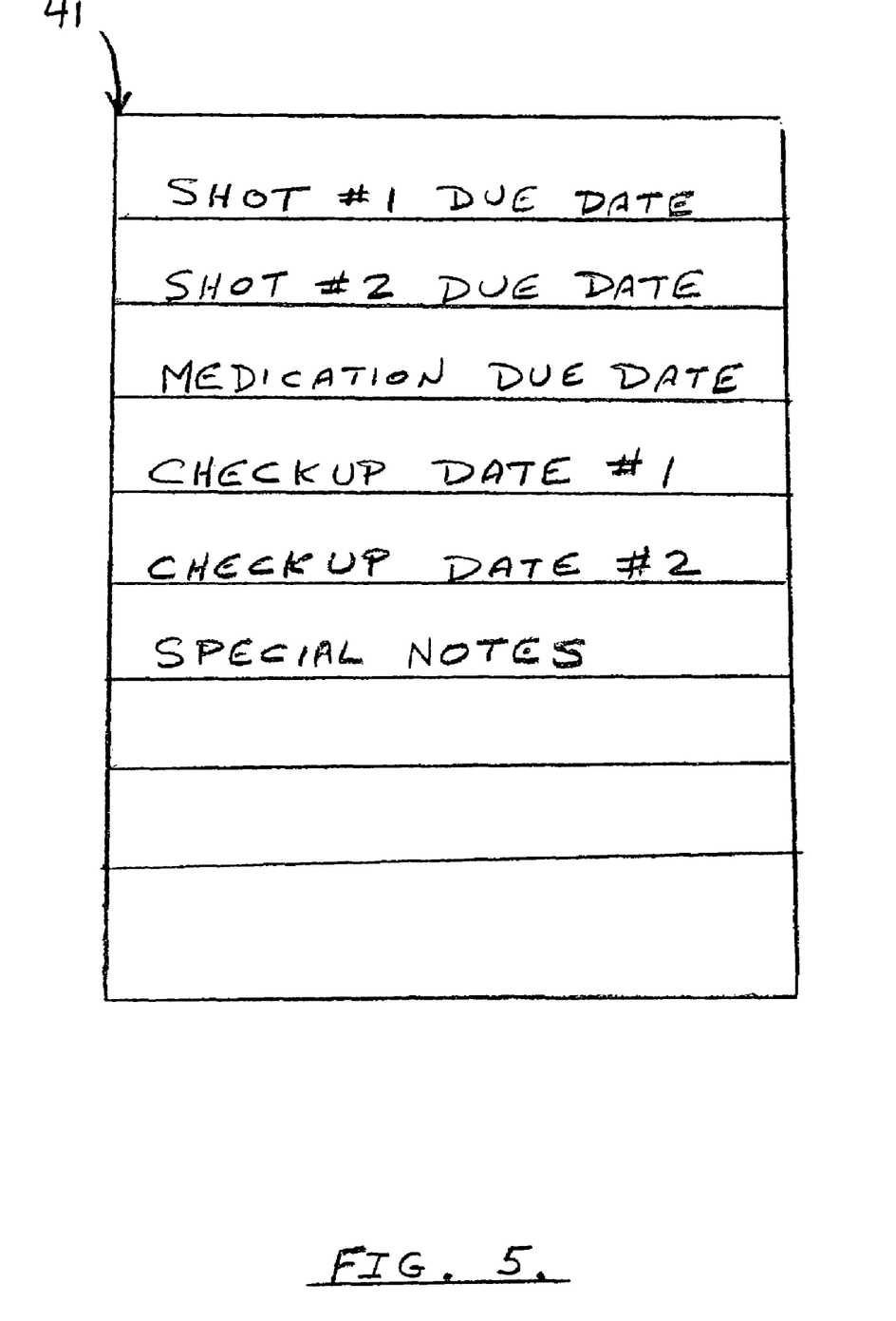

As further indicated by arrow 33, medical and medical records data is entered into the chip 10 and may include, inter alia, the type of information shown in FIG. 5.

Referring again to FIG. 3, the operating system further includes a second wireless transmitter/receiver indicated at numeral 40 and having a display screen 41 and a keyboard area 41a.

It is to be understood that the wireless device 40 is intended to be used by the pet owner as a part of the overall operating system and method.

Figure 6:
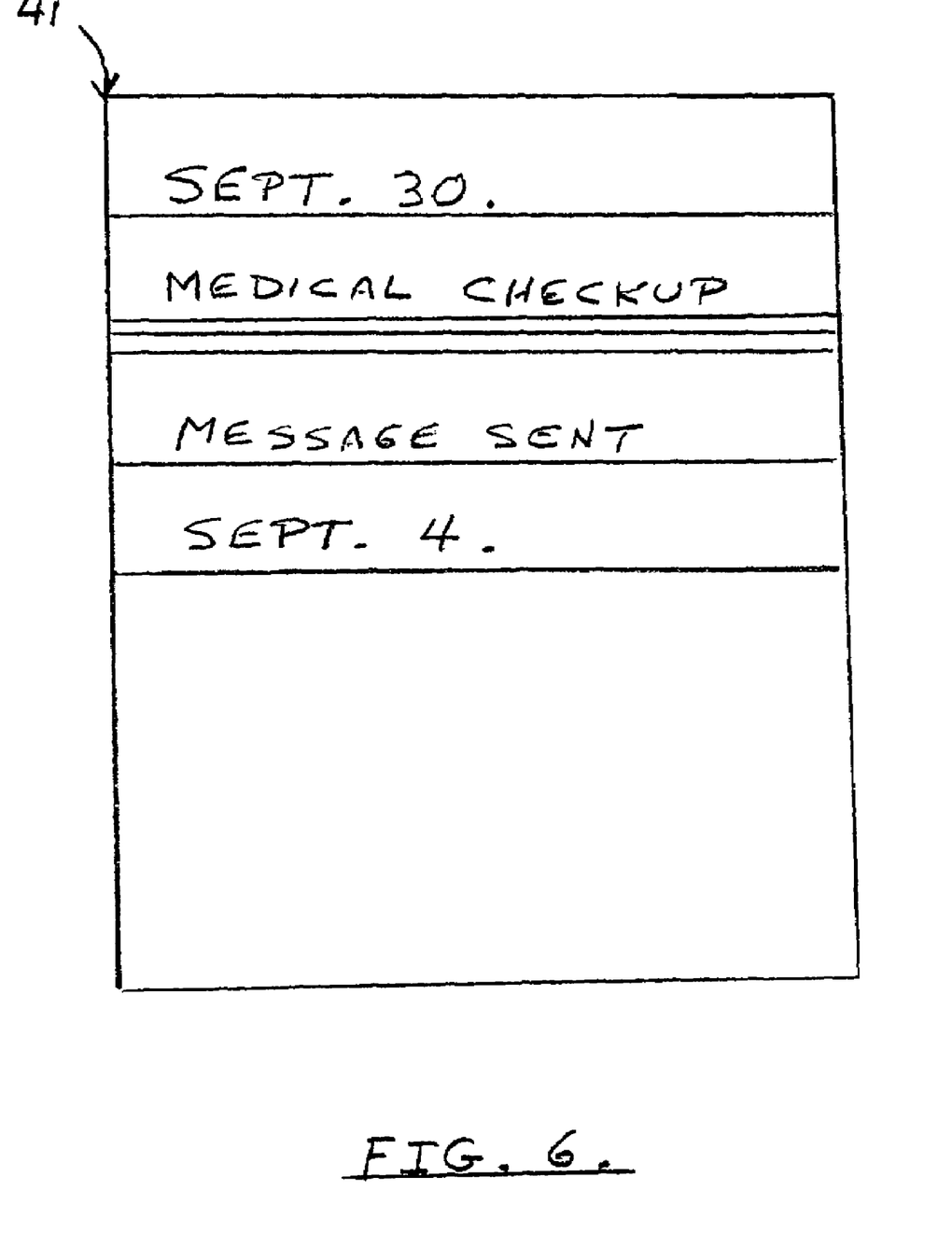

As an example of the system operation, the dashed line 33a indicates a signal being sent to the receiver 40 of the pet owner which contains relevant medical data. The medical data in this example is shown in FIG. 6 as indicating a medical checkup for the particular pet is due on September 30 and that this message was sent to the receiver 40 of the pet owner on September 4.

Such a timed transmission to the pet owner would be the normal system operating mode based on the settings in the chip 10 by the veterinarian.

In emergency or extraordinary circumstances, such as an unusual viral outbreak which may be harmful to pets, the veterinarian can send a message directly to the receiver 40 indicating such a potentially harmful situation.

Such an extraordinary circumstance transmission is indicated schematically at numeral 35 of FIG. 3.

Figure 7:
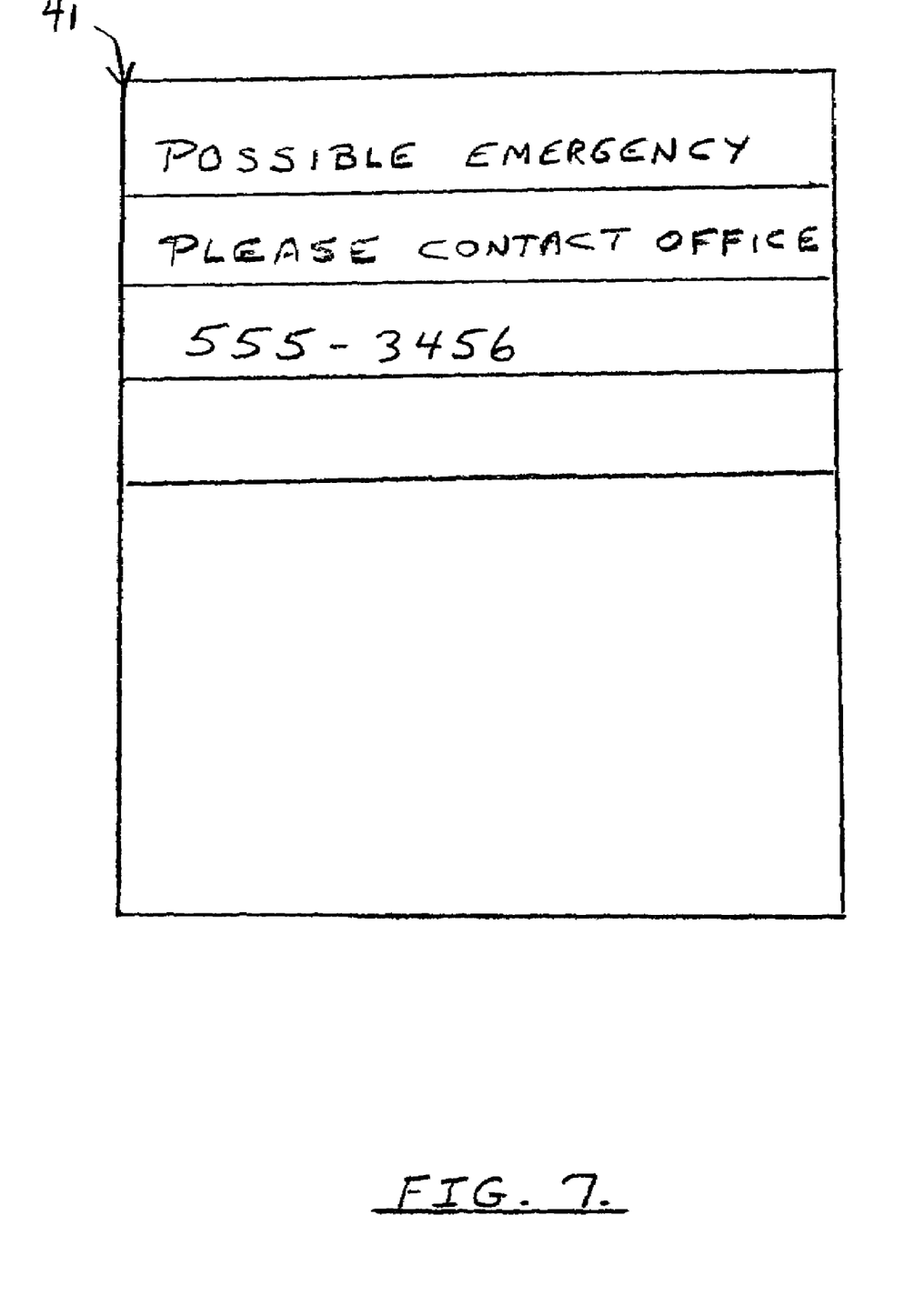

A typical display on the screen 41 of the pet owner's receiver is shown in FIG. 7 as, for example, "Possible Emergency—Please contact office at 555-3456."

As further indicated in FIG. 3, the GPS portion of the overall system operation is controlled by means of the pet owner's transmitter 40.

Numeral 51 in FIG. 3 indicates an input signal to the GPS portion of the implanted chip 10. The operation of such input signal will be further described.

Numeral 52 in FIG. 3 indicates a signal to the receiver 40 of the pet owner and has various pet location parameters to be further described.

Figure 8:
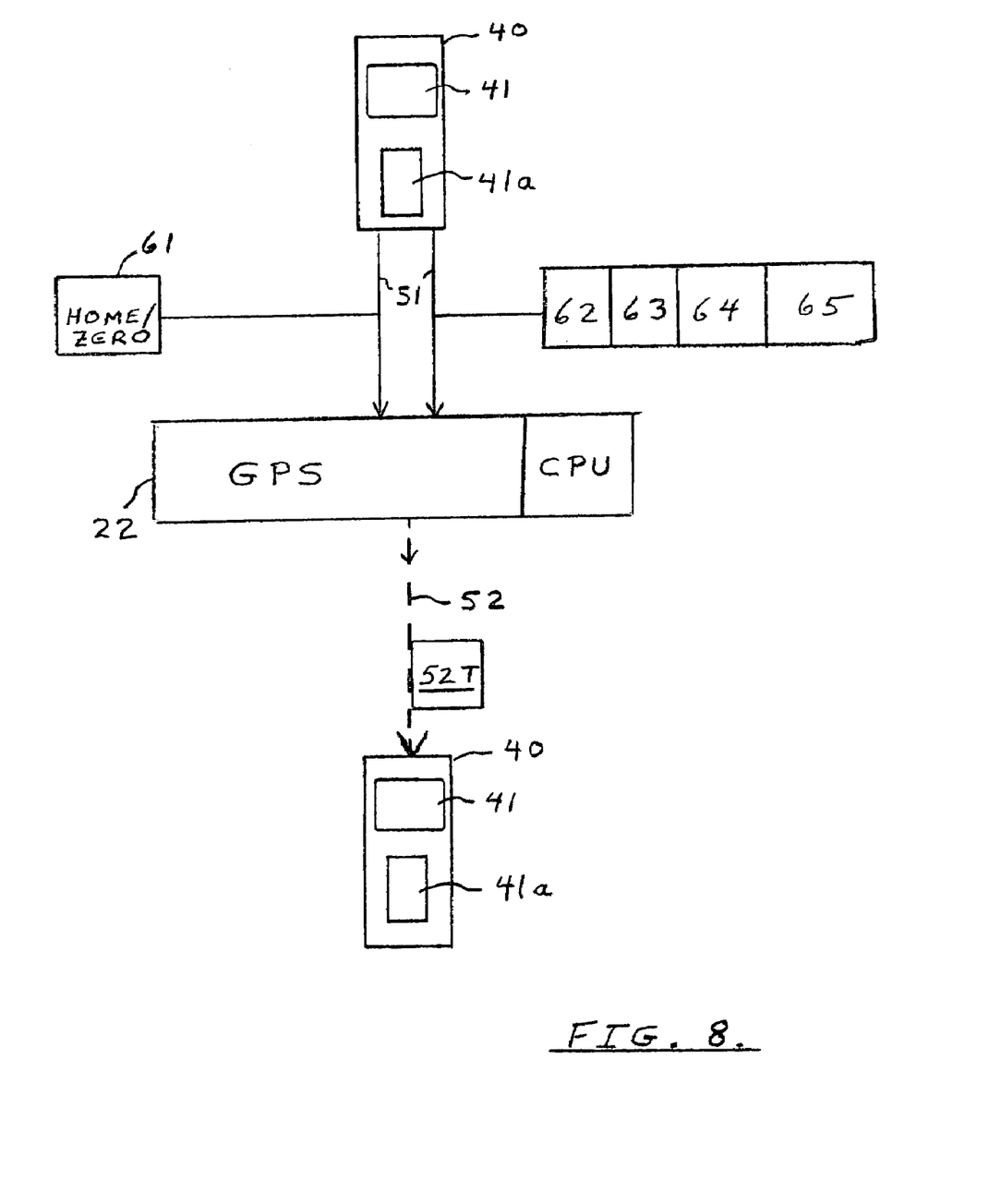
FIG. 8 is a block schematic diagram indicating geographic data which the pet owner feeds into the chip via a WRT 40 shown in the top position. The same WRT 40, shown in the lower position, receives information regarding pet location when the pet is missing.

Referring to FIG. 8, plural inputs to the GPS part of the chip are indicated at arrows 51.

In general, the pet owner can set a "Home Position" for the implanted chip and set various distance points whereby the owner is alerted if the chip and pet are outside a certain desired range.

Referring to the block diagram of FIG. 8, plural signals 51 provide inputs to the GPS portion 22 of the implanted chip.

A first input by the pet owner is to set a home or zero position as indicated at numeral 61. Such a home or zero position could be, for example, the kitchen or other selected room of the pet owner.

A second input by the pet owner would be to select a distance from the home or zero position such as fifty feet indicated at numeral 62, one hundred feet at 63, two hundred feet at 64 and five hundred feet shown at numeral 65.

For example, if the 100 feet distance had been selected, when the pet goes farther than 100 feet from the home or zero position, an alarm or notice 52 is sent to the receiver 40 of the pet owner.

Further the alarm or notice function 52 activates a tracking function 52T so that the geographic location of the "missing" pet is shown on the screen 41.

Figure 9:
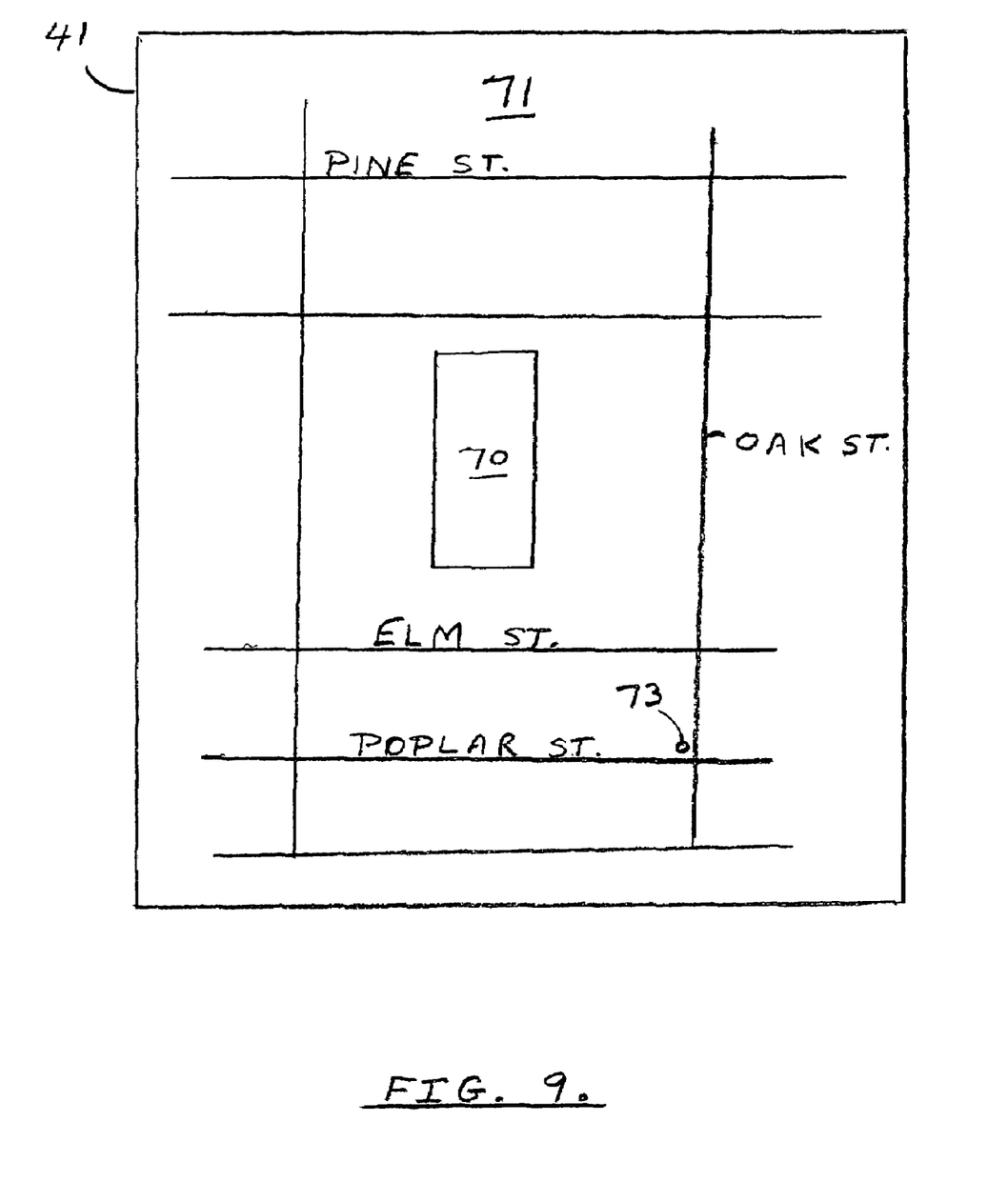
FIGS. 9 and 10 show neighborhood and home display functions to locate a missing pet.

FIG. 9 shows an example of the display screen for the missing pet.

As shown, the pet owner's home 70 is located in neighborhood 71 having a plurality of major streets as indicated at Pine, Oak, Poplar and Elm Sts.

The missing pet is shown at numeral 73, i.e. at or near the corner of Oak and Poplar Streets. Thus, the pet owner can proceed to this location and continue to track the pet as needed.

It is noted that the wireless receiver/transmitter also denominated as a "WRT", is programmable by suitable software. Examples of such software are prepared by a named co-inventor herein and will be submitted as part of the U.S. Patent Office Disclosure Document Program.

Figure 10:
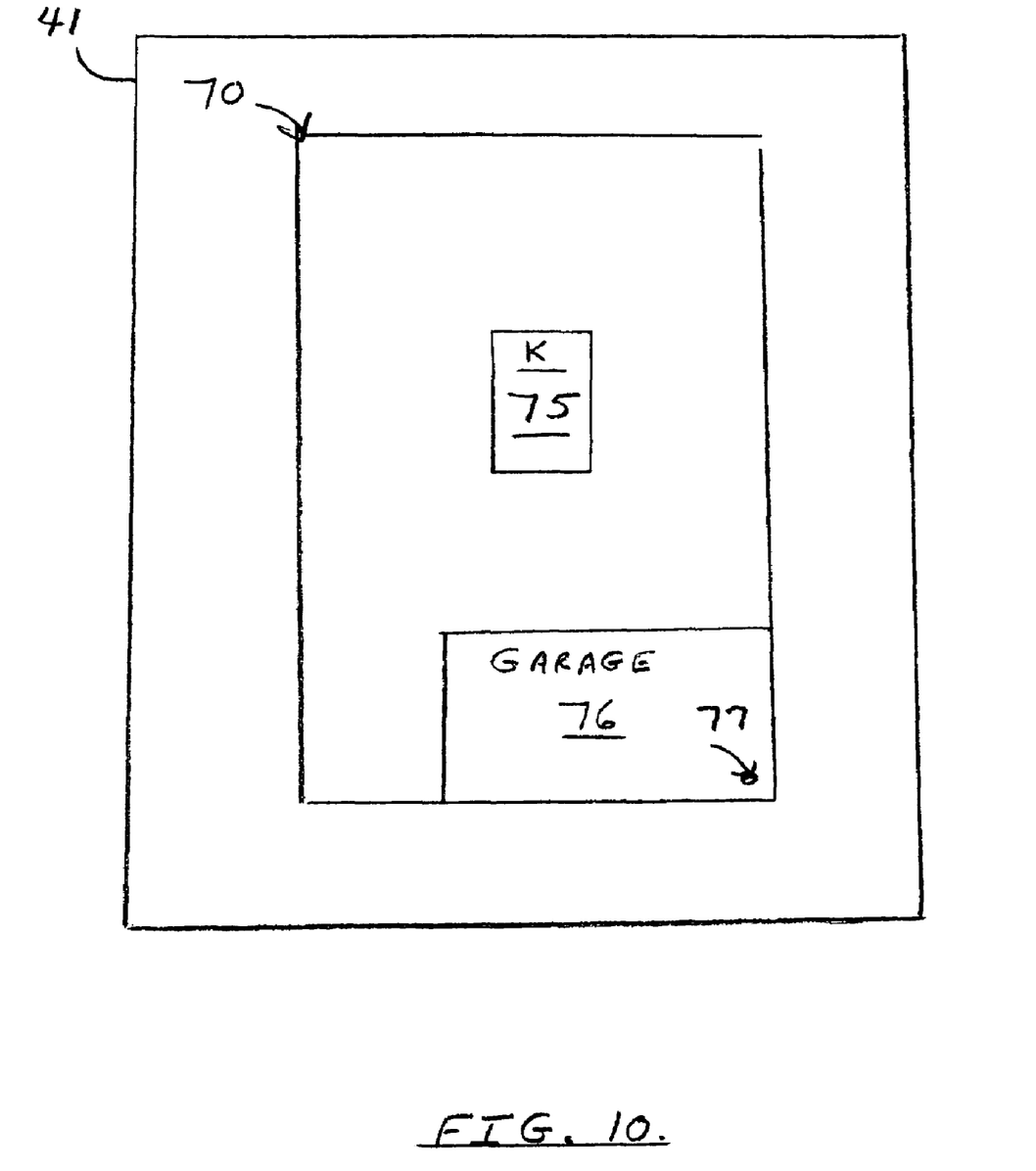

Another option regarding what can be displayed on the screen 41 of the pet owner is shown in FIG. 10. The pet owner's home 70 is indicated as having a kitchen 75 and a garage area 76. The GPS transmitter worn by the pet indicates to the pet owner that the pet is located in the garage at 77, specifically at the southeast corner thereof.

Figure 11:
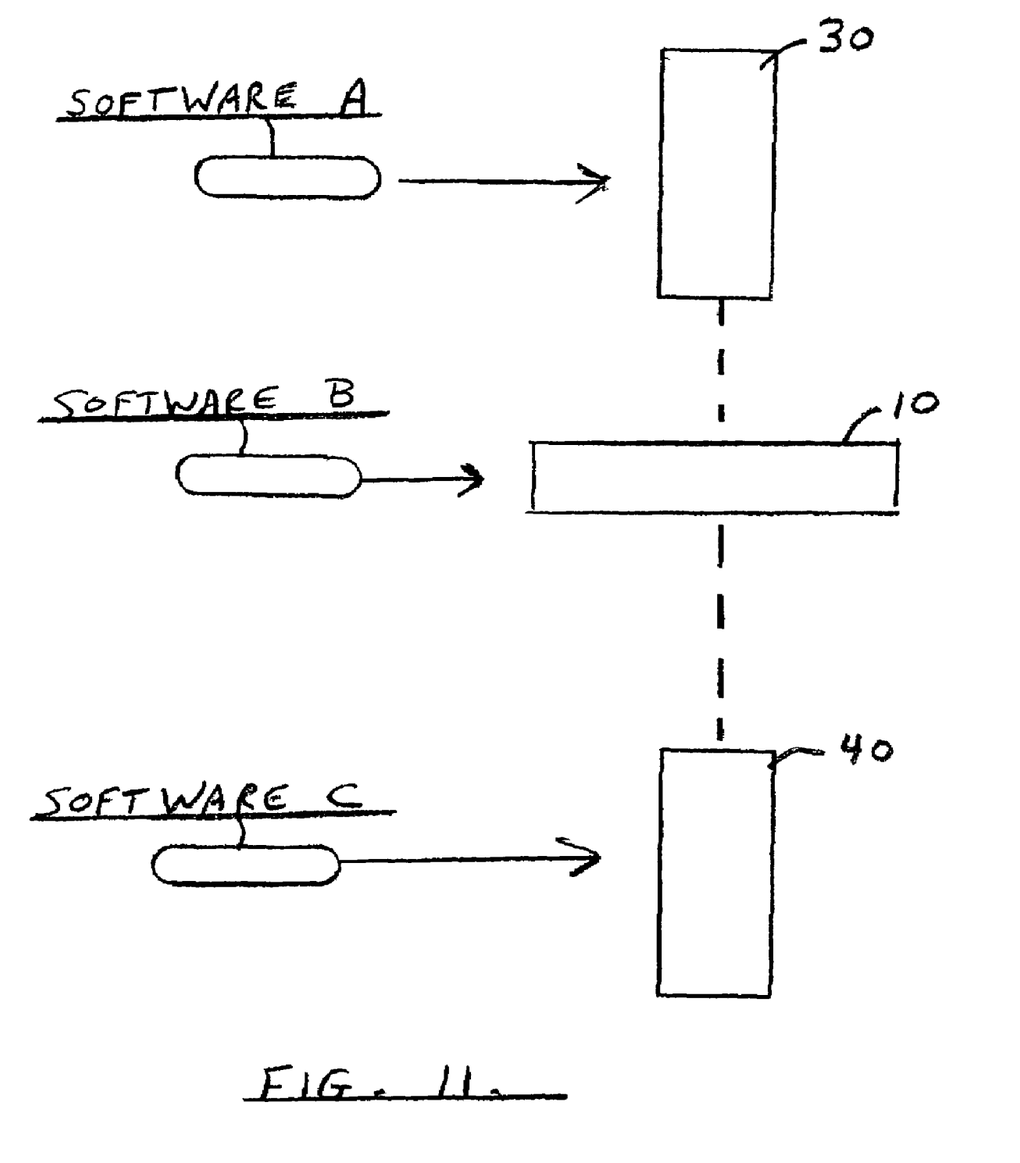
FIG. 11 shows, in schematic form, the system components as they relate to a business method for supplying an advantageous product and service.

FIG. 11 illustrates aspects of the overall method and business method advantages of the invention.

The first WRT 30 and the second WRT 40 are shown in combination with the multi-function chip 10. These three major components could be sold, for example, in kit form to purchasers visiting an office of veterinary medicine.

FIG. 11 further shows the differing software programs, A, B and C, which would be sold with the overall system. The software programs would be periodically updated and improved and marketed to system purchasers and/or subscribers.

While particular systems and methods have been shown and described, it is intended in this specification to cover all equivalent systems and methods of use, including business methods, which would reasonably occur to those of skill in the art.

The invention is further defined by the claims appended hereto.

We claim:

1. A method for providing secure identification, medical information and tracking capabilities for a pet comprising the following steps:
   A) providing a multiple function chip including a central processing CPU portion, a medical and identification storage portion and a tracking portion,
   B) implanting said multiple function chip into a pet,
   C) providing a first wireless transmitting/receiving unit which is utilized by a veterinarian to enter medical information into said chip,
   D) providing a second wireless transmitting/receiving unit which is utilized by a pet owner to enter tracking and GPS data into said chip,
   E) sending a signal to the wireless transmitting/receiving unit of the pet owner when the time for regular medical treatment is imminent,
   F) sending a signal to the wireless transmitting/receiving unit of the pet owner when the pet has left the range of a certain predetermined area.

2. A business method used by a veterinarian in combination with a pet owner and a pet, said business method comprising,
utilizing a first WRT which is operated primarily by the veterinarian or staff to enter medical and identification data onto a chip which is implanted into the pet,
providing a second WRT which is operated by the pet owner to enter geographic location data into a global positioning system which is a part of said implanted chip,
wherein said veterinarian provides instructions to said pet owner regarding the operation of said second WRT.

3. The business method of claim 2 wherein said wherein said implanted chip includes transmitter means for sending medical and geographic location information to the WRT used by the pet owner.

* * * * *